Figure 3:
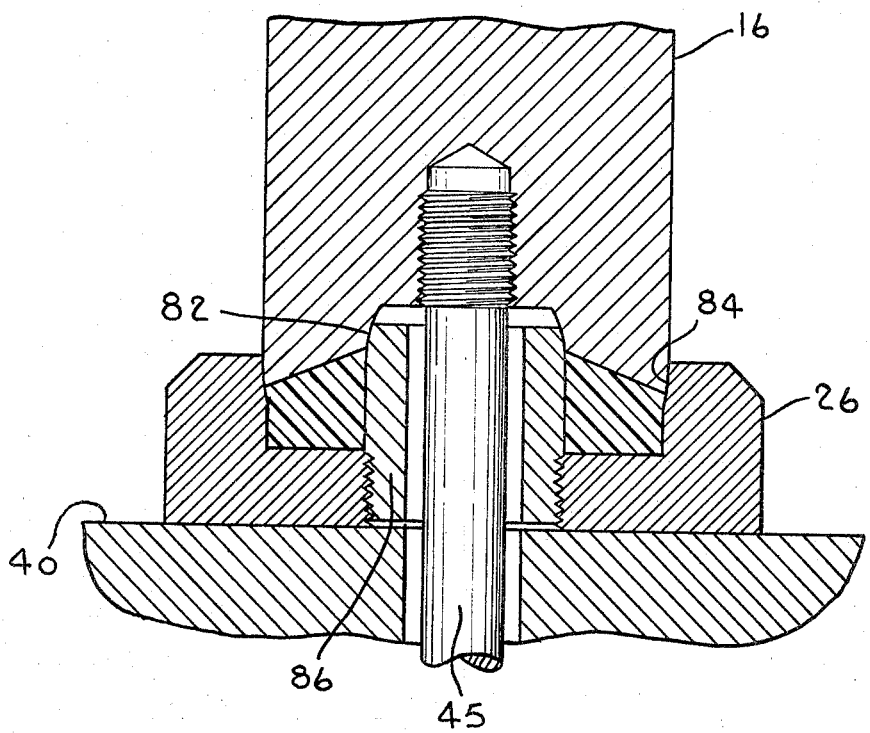

Oct. 18, 1966  R. J. SMILTNEEK  3,279,297
COUPLING MEANS
Filed Dec. 7, 1964  2 Sheets-Sheet 1
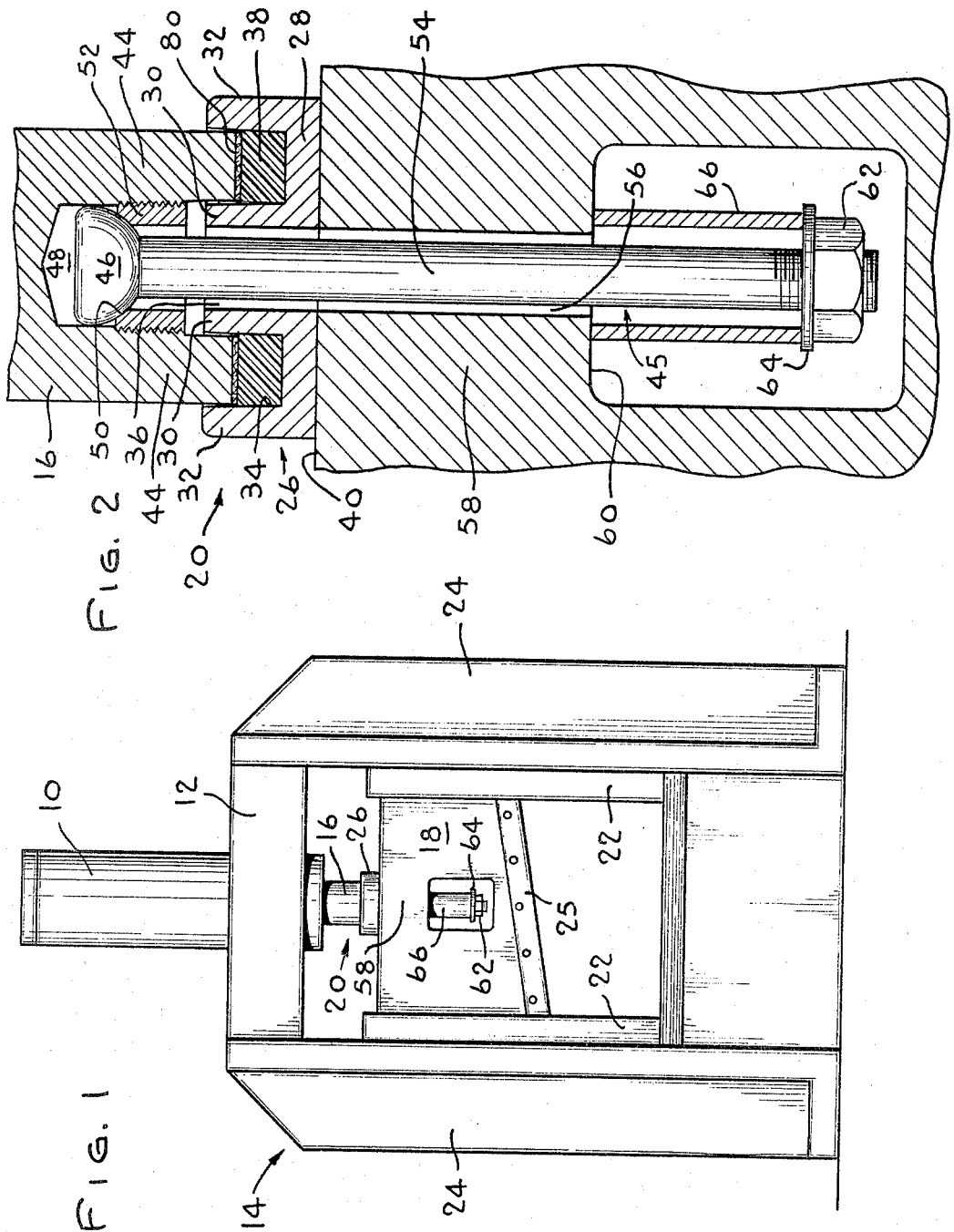
INVENTOR
RALMOND J. SMILTNEEK
BY John W. Michael
ATTORNEY United States Patent Office 3,279,297
Patented Oct. 18, 1966

3,279,297
COUPLING MEANS
Ralmond J. Smiltneek, Butler, Wis., assignor to Logemann Brothers Company, Milwaukee, Wis., a corporation of Wisconsin
Filed Dec. 7, 1964, Ser. No. 416,222
20 Claims. (Cl. 83—698)

This invention pertains to load bearing coupling means and particularly to coupling means for joining two members of a structure which is axially loaded in compression.

The principal object of this invention is to provide coupling means which are capable of transmitting axial compressive forces exerted on two adjoining members of a structure in such manner that, regardless of variances in alignment of the members or of variances in the position at which the external forces are applied to them, the resultant force exerted on each member at the coupling means will always remain in the same location in respect to such member.

This capability is of particular significance in cases where one of the members of the structure is able to withstand substantially greater flexure loads than the other. If in such cases the location of the external forces on the latter member tends to vary because of variances in load application, only that member will be subjected to flexure loads and the resultant forces exerted on the other member will be limited to compression.

The concept underlying the present invention is that the positioning member of a deformable material which has hydrostatic force transmission characteristics (hereinafter referred to as hydrostatic member) between two parts of a compression loaded structure and the confinement of the member to prevent its radial deformation will cause the member to exert pressure uniformly and perpendicularly to all surfaces by which it is confined. Because of this, the location of the resultant force exerted by the member on each part of the assembly will remain fixed in respect to the member regardless of the variance of the external forces on the assembly. This feature is of great importance in cases where the application of the compressive loads on the assembly cause a shift in the relative position of the parts, thereby causing a slight pivotal motion at the connection between the parts. In prior art coupling means, such as collar-clamp connectors and the like, the pivotal motion usually caused two metal coupling components to shift in respect to each other while under compressive loads thereby creating substantial frictional forces at their mating surfaces. In the coupling means embodying the present invention, coupling components can be provided which control the pivotal motion between the parts but which are not subjected to the compression loads of the assembly. For example, a link member can extend between both parts and be connected to each for limited pivotal motion and the hydrostatic member can be made annular in form and surround the link. In such case, the hydrostatic member will be deformed within its confinement, yet will not change its force transmitting characteristics, and the link member will merely maintain the alignment between the parts at their connection without being subjected to the compressive forces.

In view of the above, another important object of the present invention is to provide coupling means for connecting two parts of an assembly for limited pivotal motion in respect to each other while under compressive loads, without subjecting the components of the coupling means to substantial frictional movement while under the compressive forces of the assembly.

Coupling means attaining the above object are of particular significance in a ram-slide assembly of a power press. In power presses the shifting of the slide to a position out of alignment with the ram while the ram-slide assembly is under extremely high compressive loads has caused failures of the ram and the coupling members. In applications of this type the critical compressive loads often occur when the tool strikes its work piece. In such cases the press frame sometimes distorts and thus forces the slide to pivot in respect to the ram at a time when impact of the tool raises the compressive load to a maximum. Also, maximum compressive loads often occur at the end of the power stroke. This load is caused by the inertia gained in the interval between the "break-through" at the end of the resistance of the work piece and the actual stop at the end of the power stroke. The coupling means embodying the present invention have eliminated the detrimental effects of this type of loading.

In view of the above, a further object of the present invention is to provide an improved coupling member for connecting a slide to a ram in a power press.

The coupling member may be comprised of a separate component which rests on one of the connected parts and which is contoured to mate with the other part to confine the hydrostatic member. Because of this feature the one part may be slightly out of alignment with the other at the time of assembly, yet the coupling component may be laterally adjusted to compensate for misalignments far beyond those thought possible heretofore. This feature again is of great importance in power press applications. In these, the ram and slide may be connected by the laterally adjustable coupling component to transmit compressive forces and by a tension load resisting member which is provided substantially at the center line position and is connected to the ram and slide in a manner that it is not affected by limited lateral misalignment between these parts, nor by their limited pivotal motion.

In view of the above, a further object of this invention is to provide a laterally adjustable coupling member for a ram-slide assembly which member will have the above described advantages.

Other objects and advantages will be pointed out in, or be apparent from, the specification and claims, as will obvious modifications of the single embodiment shown in the drawings, in which:

FIG. 1 is a front plan view of a power press;
FIG. 2 is an enlarged cross-sectional view of the coupling means embodying the present invention; and
FIG. 3 is a fragmentary cross-sectional view of a second embodiment of the present invention.

Referring to the drawings in detail, FIG. 1 shows a hydraulic shear press in which hydraulic actuating means 10 is mounted on the cross member 12 of the frame 14 and is operable to reciprocate its ram 16. A slide member 18 is connected to the ram by a coupling member 20 and is guided in guide rails 22 which are fixed to the columns 24 of the frame. The slide member carries a tool 25 which is removably secured thereto.

As shown in FIG. 2, an annular component 26 is positioned between the ram and slide members. The component is of a cross-sectional U-shaped contour and has a flat bottom 28 and radially inwardly and outwardly located upstanding flanges 30 and 32 which define sidewalls of an annular cavity 34. The flange 30 defines a central aperture 36 of the component. An annular member 38 fills the lower portion of the cavity. The member is of a material which is deformable yet substantially noncompressible and which has hydrostatic force transmission characteristics. Elastomers such as neoprene, polyurethane and rubber may be used to form the member 38. Other materials having the heretofore described properties are known and could be selected by one skilled in this art. The member 38 will be referred to as a hydrostatic member.

The bottom of the component 26 rests on the top face 40 of the slide member. The face of the ram is formed to provide an annular male member 44 which is received in the upper section of the cavity 34 and defines with the sidewalls of the component an enclosure for the hydrostatic member. As compressive forces are applied to the ram-slide assembly the sidewalls prevent any radial deformation of the hydrostatic member and the forces are transferred between the slide and ram by the member. Because of the hydrostatic force transmission characteristics of the material the pressure exerted on the ram at its face is uniform throughout the area in contact with the hydrostatic member and therefore the resultant force acting on the ram will always be located at a predetermined place in respect thereto.

A high tensile strength bolt 45 connects the slide to the ram to oppose tensile forces acting on the ram-slide assembly. The bolt is in axial alignment with the center line of the ram. It is connected to the ram by a semi-spherical head 46 which projects into a cavity 48 of the ram and is in engagement with a complimentary spherical portion 50 formed on the face of a bushing 52 which is threadably mounted in the cavity. The central section 54 of the bolt extends through the aperture 36 of the component 26 and through an aperture 56 provided in the section 58 of the slide.

The bolt is connected to the lower face 60 of the slide section 58 by a nut 62 which acts through a washer 64 and bushing 66. The nut is tightened sufficiently to prestress the bolt to the extent necessary for preventing inertia separation of the parts. The diameter of the bushing is larger than the aperture 56 and therefore permits certain variance of the radial location of the bolt in respect to the slide without affecting the effectiveness of the connection. The diameter of the apertures 56 and 36 of the slide and component 26 are larger than the diameter of the bolt and thereby provide clearance to permit variances in the bolt location. Because of this the ram may be out of alignment with the slide without affecting the connecting means.

In the embodiment of FIG. 2 a small radial clearance (.001 to .004 inch) is provided between the flanges 30 and 32 and the mating surfaces of the male member 44. These clearances as well as the spherical connection of the bolt to the ram permit some pivotal motion of the slide around its connection to the ram. In some cases it might be advisable to provide a leather washer 80 between the hydrostatic member 38 and the face of the ram to assure that the material of the member does not extrude in the clearances. However, in most cases the pressures involved are not sufficiently high to cause extrusion.

The above described coupling means is of particular significance in a ram-slide assembly of a power press. In this type of application the components of the press are often subjected to very high loads, with the loads on the coupling components frequently being in the neighborhood of 2,000 to 10,000 p.s.i. Also, the loads tend to shift because of slight deflections of the guide members 22 during the power stroke of the press and/or because of the particular nature of the work piece. These factors tend to exert a moment around the ram-slide connection thereby causing a slight pivotal motion as well as shifting the location of the axial resultant force exerted by the slide on the connecting member.

In prior art applications, the ram-slide connection was usually comprised of a collar and key or clamp arrangement in which the compressive forces between the ram and slide were transferred by a direct metal to metal contact. Because of this the pivotal motion created frictional movement between the parts while they were under great load, and also permitted variance in the location of the resultant force exerted by the slide in respect to the center line of the ram. Both conditions contributed significantly to failures of the ram and the connecting structure.

In the present invention the pivotal motion of the slide in respect to the ram will cause a change in the shape of the enclosure for the hydrostatic member 38, in that one side of the enclosure will become slightly narrower (in its height dimension) and the other side will become correspondingly wider. The member 38 will merely deform while still exerting uniformly equal pressure on all surfaces of its enclosure. Because of this, of course, the location of the resultant force on the ram will not change. Also, the pivotal motion at the spherical connection of the bolt and at the connection of the mating surfaces of the component 26 and the male member 44 will be between parts which are not subjected to the compressive forces exerted on the ram-slide assembly. A slight bending force will be exerted on the bolt or a slight deformation experienced by the bushing 66, however, their deformation is well within acceptable limits and is in no way critical.

The embodiment shown in FIG. 3 differs from that of FIG. 2 in that the portions of flanges 30 and 32 which are in contact with the ram are slightly rounded at 82 and 84 and that the corresponding ram sections are equally rounded to thereby permit some pivotal motion between the ram and slide. Because of this, the clearances between these parts are eliminated and the chance of extrusion is further reduced. Also, the bolt 45 is directly threadably connected to the ram and radially inner flange 30 is formed by an independent bushing 86 threadably connected to the bottom 28 of the component 26. The fixed connection of the bolt to the ram is practically not affected by the pivotal motion because the bolt is connected at the center line of the ram and slide and therefore is subjected only to the minimum distortion. The reason for the two piece component is essentially that the cost of manufacture in some cases may be lower than that of the one piece component shown in FIG. 1. Also, the member 38 has been changed to have an upwardly tapered top surface. This contour facilitates a more uniform deformation and force distribution during the pivotal motion. Except for the above mentioned differences, the embodiment of FIG. 3 is equivalent in structure and function to that of FIG. 2.

Although but a single embodiment of the present invention has been illustrated and described, it will be apparent to those skilled in the art that various changes and modifications may be made therein without departing from the spirit of the invention or from the scope of the appended claims.

I claim:
1. A coupling member connecting a slide to a ram in a ram-slide assembly of a power press, comprising:
   a member having hydrostatic force transmission characteristics;
   means locating said member between the ram and slide to subject the member to the compressive forces acting on the assembly and to transmit said forces between the slide and ram;
   means confining said member to prevent its radial deformation; and
   means connecting the slide to the ram to resist tension forces acting on the assembly.

2. A coupling member positioned between opposing faces of slide parts in a ram-slide assembly of a power press, comprising:
   a component having a bottom and sidewalls to define an open cavity, said component being positioned with its bottom against the face of one of the parts;
   a member of a deformable yet substantially noncompressible material having hydrostatic force transmission characteristics positioned in said cavity;
   the face of the other part being formed to compliment said cavity and being received therein to confine said member in said cavity, said component and face of said other part cooperating to subject said member to the compressive forces acting on the assembly and to cause said member to transmit said forces between the slide and the ram; and means connecting the slide to the ram to resist tension forces acting on the assembly.

3. A coupling member according to claim 2 wherein the points of connection of said component and said connecting means with one of the parts are contoured to permit limited pivotal motion between the parts.

4. A coupling member positioned between opposing faces of a ram and a slide in a ram-slide assembly of a power press, comprising:

an annular component having a generally U-shaped cross-sectional contour to define an annular cavity, said component being positioned with its closed end against the slide and receiving at its open end the end of the ram, said end of the ram being contoured to mate with said cavity and to define with said component an enclosure;

a member having hydrostatic force transmission characteristics filling said enclosure and being subjected to the compressive forces acting on the assembly to transmit such forces between the slide and ram; and connecting means fixed at one of its ends to the ram at the axial center line of the ram and projecting through the central portion of said component and fixed at the other of its ends to the slide to oppose separation between the ram and the slide.

5. A coupling member according to claim 4 in which said end of the ram and the sides of said component are dimensioned to permit limited pivotal motion of said slide component in respect to the ram.

6. A coupling member according to claim 4 wherein said connecting means is comprised of a ram connecting part, a slide connecting part and an axially elongated part extending between said parts; and wherein said elongated part projects through said component and an axially extending aperture in a portion of the slide, said component being positioned on one axial side of said portion and said slide connecting part being positioned on the other side of said portion, the component and said aperture being dimensioned to provide radial clearance for said elongated part, and said slide connecting part being operable to fix said connecting means to the slide within a range of radial positions of said connecting means in respect to the slide to thereby permit some radial misalignment between said ram and slide.

7. A coupling member according to claim 6 wherein said end of the ram and the slide of said component are dimensioned to permit limited pivotal motion of said slide and component in respect to the ram.

8. A coupling member according to claim 7 wherein some clearance is provided between the sides of said component and the portions of the ram end in engagement with said component to permit said pivotal motion.

9. A coupling member according to claim 7 wherein the sides of said component and the portions of the ram in engagement with said component are rounded to permit said pivotal motion.

10. A coupling member according to claim 9 wherein said component is comprised of a round flat member having a central aperture and forming the bottom of the component, an upstanding flange fixed to said round member at its outer peripheral portion, and a bushing threadably connected to said round member at said aperture.

11. A coupling member according to claim 8 wherein said ram connecting part is a spherical bolt member and engages the ram at a rounded seat.

12. A coupling member adapted to transmit compressive forces between two parts of a two part assembly, comprising:

a member of a deformable yet substantially noncompressible material which has hydrostatic force transmission characteristics;

means locating said member between opposing faces of the parts to subject the member to the compressive forces acting on the assembly and to transmit said forces between the parts; and means confining said member to prevent its deformation in a direction other than in which the compressive force is to be transmitted by the coupling.

13. A coupling member according to claim 12 including means connecting the two parts to resist tension forces acting on the assembly.

14. A coupling means adapted to be positioned between opposing faces of two parts to connect such parts in a two part assembly, comprising:

a female section on one of the parts and a male section on the other of the parts;

said female section being of an annular and cross-sectionally U-shaped form having a radially outer and inner side wall which define between them an annular cavity;

said male section being of an annular contour and being received in said cavity to define with said female section an annular enclosure;

a member having hydrostatic force transmission characteristics filling said enclosure and being subjected to the compression forces acting on the assembly to transfer such forces between the parts; and connecting means fixed at its ends to each of the parts and extending through the center of said female section, said connecting means being operable to oppose separation between the parts.

15. A coupling means according to claim 14 wherein one of said sections is a separate component from said parts and is movable radially in respect to its part to thereby permit some misalignment between the parts.

16. A coupling means according to claim 15 wherein said connecting means is comprised of two connecting ends operable to engage with said parts and an extending section located between said ends and extending in an aperture of one of the parts and wherein radial clearance is provided between said extending section and said component and between said extending section and the sidewalls of said aperture parts to thereby permit said connecting means to be effective despite misalignment between the parts.

17. A coupling means according to claim 16 wherein said sides of said female section and said annular male sections are rounded to permit limited pivotal motion between the parts.

18. A coupling member adapted to be positioned between opposing faces of two parts to connect such parts in a two part assembly, comprising:

confined means having hydrostatic force transmission characteristics positioned between said faces to be subjected to and to transmit between the parts compressive forces to which the assembly is subjected; and pivotal connecting means not subjected to said compressive forces and connecting said parts for limited pivotal motion around the coupling member while the assembly is subjected to said compressive forces.

19. A coupling member according to claim 18 including means operable to resist tensil forces to which the assembly is subjected.

20. A coupling member according to claim 19 wherein said confined means is a high tensil strength elastomer.

References Cited by the Examiner

UNITED STATES PATENTS 3,138,257   6/1964   Andersen _____ 100—214 X

WILLIAM S. LAWSON, *Primary Examiner.*

UNITED STATES PATENT OFFICE
CERTIFICATE OF CORRECTION

Patent No. 3,279,297                          October 18, 1966

Ralmond J. Smiltneek

It is hereby certified that error appears in the above numbered patent requiring correction and that the said Letters Patent should read as corrected below.

Column 4, line 64, for "of slide" read -- of ram and slide --; column 5, line 33, after "slide" insert -- and --; line 50, for "slide" read -- side --.

Signed and sealed this 5th day of September 1967.

(SEAL)
Attest:

ERNEST W. SWIDER                          EDWARD J. BRENNER
Attesting Officer                            Commissioner of Patents